United States Patent [19]

Hoffman et al.

[11] 3,972,835

[45] *Aug. 3, 1976

[54] FLUID CRACKING CATALYST BASED ON SILICA SOL MATRIX

[75] Inventors: Gordon H. Hoffman, Baltimore; Richard J. Nozemack, Lutherville; Curtis Homer Elliott, Jr., Baltimore, all of Md.

[73] Assignee: W. R. Grace & Co., New York, N.Y.

[ * ] Notice: The portion of the term of this patent subsequent to Feb. 18, 1992, has been disclaimed.

[22] Filed: Apr. 23, 1974

[21] Appl. No.: 463,326

[52] U.S. Cl............................................. 252/455 Z
[51] Int. Cl.$^2$........................................... B01J 29/06
[58] Field of Search ................................. 252/455 Z

[56] References Cited
UNITED STATES PATENTS

| | | | |
|---|---|---|---|
| 3,346,509 | 10/1967 | Stewart | 252/453 |
| 3,507,812 | 4/1970 | Smith et al. | 252/455 Z |
| 3,650,988 | 3/1972 | Magee, Jr. et al. | 252/451 |
| 3,867,308 | 2/1975 | Elliott, Jr. et al. | 252/455 Z |

*Primary Examiner*—Carl F. Dees
*Attorney, Agent, or Firm*—Joseph P. Nigon

[57] ABSTRACT

A process for preparing a hydrocarbon cracking catalyst is disclosed. The process consists of preparing a silica sol by passing sodium silicate through an ion exchange resin column to form a silica sol containing about 5% silica. Clay and zeolitic components are added and the product is spray dried. This process is advantageous in that it produces a more dense and hence more attrition resistant catalyst.

5 Claims, No Drawings

FLUID CRACKING CATALYST BASED ON SILICA SOL MATRIX

BACKGROUND OF THE INVENTION

Catalytic cracking which came of age as a major refining process in 1940's was revitalized by the introduction of molecular sieve type catalyst. It was found that dramatic improvements in cracking activity and selectivity could be obtained by incorporating relatively small amounts of molecular sieves into the catalyst. The sieves were found to have intrinsic activities for cracking far greater than the conventional amorphous-silica-alumina catalyst.

There are several patents describing processes for preparation of these zeolites. U.S. Pat. No. 3,692,665, for example, covers a method of preparing a faujasite type zeolite that is stabilized by cation and thermal stabilization. The older and more conventional cracking catalysts are described in patents such as U.S. Pat. No. 3,404,097 to Wilson et al. which describes a silica magnesia flouride catalyst. U.S. Pat. No. 3,650,988 of Magee et al. covers a process for preparing a hydrocarbon conversion catalyst containing a semisynthetic portion, i.e., clay and silica alumina, and a zeolitic portion. There are several other patents describing processes for preparing molecular sieves containing catalysts. U.S. Pat. No. 3,425,956 of Baker et al. is typical of a large body of art in this area.

U.S. Pat. No. 3,753,929 of Linsey is typical of a body of art describing zeolite catalysts in a silica matrix wherein a silica sol is used to furnish the silica for the catalyst preparation. U.S. Pat. No. 3,499,846 to Michalko describes another process for preparing these catalysts. The processes described in the prior art are fairly complex and require both washing and exchange steps to remove the sodium.

BRIEF DESCRIPTION OF THE INVENTION

We have found that a catalyst exhibiting excellent attrition resistance and high activity can be prepared by binding clay and faujasite with a silica sol. In our process the silica sol is formed by passing a sodium silicate solution through a column of an ion exchange resin. The effluent from the column is a sodium free silica sol that contains about 1 to 8% preferably about 5% silica. The product has a pH of about 3. This sol exhibits a gellation time of approximately 2–7 days depending on concentration, pH and temperature and can advantageously be used as is.

The catalyst can be prepared as a composition that contains clay and zeolite. A typical method of preparation would have the clay constituent added to the silica sol followed by the zeolite, preferably a faujasite prepared as a slurry, with the final mix pH being in the range of 3.5–5.5 The slurry of zeolitic material is added to sol-clay mixture and spray dried. The principal advantage of our process is that the ammonium sulphate or water washing that is normally required in other preparatory methods depending on the use of silica sol is eliminated by our process. The product recovered from the spray drier requires no washing.

The zeolite is normally added as a rare earth containing product. However, other stable zeolites may also be used. Thus, no additional exchange is needed.

While this method outlines a procedure to make a heavy, hard, active catalyst, catalysts that are not as dense and with more pore volume have shown acceptance by the petroleum refining industry. This basic method can be modified to provide such a catalyst while still maintaining the environment advantages of a wash-free purification. To accomplish this, the fresh sol can be allowed to gell with long residence times or be synthetically gelled by raising the pH to 5 to 9 preferably 6. The gell will then have a total pore volume similar to that of more conventional products, about 0.3 (nitrogen). The addition of clay and zeolite can be made as mentioned above.

DETAILED DESCRIPTION OF THE INVENTION

The first step of the process is the preparation of the silica sol. This is the critically important step of the process since it provides a sol that is essentially free of sodium and other contaminants. The sol is prepared by passing a dilute sodium silicate solution adjusted to about 1 to 8 preferably about 5 weight percent through a cation exchange resin of the strong acid type. These resins are commercially available in quantity and have been described extensively in the literature.

The effluent from the column is a polysilicic acid containing 1 to 8 preferably 5% silica which has a pH of about 3, the pH varying with operating conditions. The sol exhibits a gellation time of approximately 7 days. Because of the long gellation time the sol can be used as is.

However, in cases where gellation is desired, the sol can be easily gelled by increasing the pH to about 5.3 with sodium silicate or any other base. This requires a very small about of sodium silicate, usually about 1 pint of silicate to 25 gallons of 5% sol. After the pH is adjusted the sol gels in 20–30 minutes. In the next step of the process clay is added to the silica sol. The clay is present in amounts of from about 10–65%, preferably 25–60% by weight of the catalyst Naturally occuring clays, such as kaolin, halloysite and montmorillonite can be used. Commercially available clays described as having a particle size of 60–90% of less than 2 microns or naturally occuring clays may be used to advantage in the preparation of the catalyst. It is contemplated that the heat or chemically modified clays such as metakaolin or acid treated halloysite may be used therein. The clay can be added dry or as a slurry and has the effect of slightly raising the pH of the sol.

The zeolite is added in the next step of the process. The preferred zeolite is the widely available zeolite known as faujasite. The zeolites publicized by Linde Division of Union Carbide Corporation is type X and type Y zeolites of the faujasite structure. These zeolites normally have a silica to alumina ratio of about 2.5 to about 7 with those having a silica to alumina ratio of about 2.6 to 6 being preferred.

It is preferred that the faujasite added be pretreated to reduce the $Na_2O$ content to less than 1% and to be exchanged with rare earth so that the zeolite has a rare earth content of about 5 to 18%.

The faujasite is normally added as an aqueous slurry to the silica sol. The slurry of the faujasite has a pH of about 3–6. With this pH the faujasite can easily be dispersed into the silica sol carrier without particle encapsulation or gel lump formation.

The next step of the process is the spray drying. In the preferred process where the silica sol is used the spray drying is the last step of the process. No particular precaution need be taken in the spray drying step since the silica sol does not gel for long periods of time.

Normal operating techniques are used to produce a product with a nominal 60 micron average particle size.

One of the important advantages of this process is that the catalyst prepared from the sol requires no ammonia exchange or water washing. In the preferred process where the faujasite has been pretreated to remove the sodium and to add the desired amount of rare earth, the spray dried product is the finished catalyst. The catalyst is then ready for use in the typical fluid cracking operation. It is contemplated that the catalyst may also be prepared in the form of a bead-type catalyst which is suitable for use in a moving bed catalytic operation.

The catalyst prepared according to the process of this invention have an alumina content of about 20 to 31%, a silica content of 35 to 70%, a rare earth content of 2 to 4%. The $Na_2O$ content is less than 1% and the sulfate content is less than 0.5. The products have the water pore volume of about 0.10 to 0.35 and a nitrogen pore volume of 0.14 to 0.30. The catalyst have an apparent bulk density of above about 0.7. Average bulk densities of as high as 0.94 have been obtained. This is not say that extensions to these properties could not be made, depending on the particular need.

The catalyst prepared by our process have an acceptable degree of attrition resistance. Typically, our catalyst when subjected to a standard attrition test will be found to have attrition indices of 1 to 18, or about 35 for the gelled revision. The attrition index, of course, is directly related to the apparent bulk density. The products with very high bulk density have the lowest attrition indices.

The Davison Attrition Index (DI) as referred to in the following examples is determined as follows: A 7 g. sample is electrical to remove particles in the 0 to 20 micron size range. The particles above 20 microns are then subjected to a 5 hour test in the standard Roler Particle Size Analyzer using a 0.07 inch jet and 1 inch I.D. U-Tube as supplied by American Instrument Company, Silver Spring, Md. An air flow of 9 liters per minute is used. The Davison Index is calculated as follows:

Davison Index $$= \frac{\text{0-20 micron material formed during test}}{\text{Original 20+ micron fraction}} \times 100$$

Our novel catalyst was evaluated by comparing the activity of these catalysts with the activity of a standard high activity catalyst containing calcined rare earth faujasite in the hydrogen form. In this comparison both catalysts are subjected to the standard activity test described by Ciapetta and Henderson in the Oil and Gas Journal of Oct. 16, 1967 at pages 88 to 93. This procedure for comparing the activity of our catalyst with the standard catalyst is used to obtain the data set forth in the following examples.

Our invention is illustrated by the following specific but non-limiting examples.

EXAMPLE 1

A silica sol was prepared by diluting commercially available 3.25 ratio sodium silicate to a solution containing 5 weight percent $SiO_2$ silicate with water. The resulting solution was passed through a cation resin of the strong acid type, namely Amberlite 200. The effluent from the column was a polysilicic acid containing 5 weight percent silica. The pH of the sol was 3.0. This sol exhibited a gellation time of approximately 7 days. A total of 175 pounds of this sol was mixed with 10 pounds of clay and 2.14 pounds of a type Y zeolite that had been previously treated to reduce the $Na_2O$ content to less than 3% and impart a rare earth content of about 15%. The resulting slurry was spray dried at an inlet temperature of 600°F. and an outlet temperature of 350°F. The product contained the following percentage of components on a dry basis: alumina 28.8, rare earths 2.12, $Na_2O$ 0.53, sulfate 0.15, the water pore volume was 0.07 and the nitrogen pore volume 0.15. The product had an apparent bulk density of 0.91 and a Davison Attrition Index of 0.1.

The activity of the resulting catalyst was compared to the activity of a standard clay based zeolite catalyst having a rare earth content of about 15%.

The test was carried our after deactivation temperatures of 1050° and 1070°F. with steam pressure of 60 and 90 lbs., weight hourly space velocities of 2 and 16 and catalyst to oil ratio of 3.0 to 1. The results are set out in the table below.

TABLE I

| | Microactivity at 1050°F | |
|---|---|---|
| WHSV | 2 | 16 |
| Catalyst of this Example | 87.9 | 62.0 |
| Standard Catalyst | 92.7 | 77.4 |
| | Microactivity at 1070°F | |
| WHSV | 2 | 16 |
| Catalyst of this Example | 86.7 | 60.6 |
| Standard Catalyst | 87.7 | 68.6 |

It is obvious from review of these data that the catalyst of our invention compares favorably with the standard catalyst of the same type prepared to have a rare earth content of about 15%.

EXAMPLE 2

This example illustrates another preparation of the catalyst using the process described in Example 1.

A silica sol was prepared by diluting commercially available sodium silicate to a 5% solution with water. A total of 175 pounds of this sol was mixed with 2.9 pounds of the faujasite treated as in Example 1 and 12.5 pounds of clay to prepare a formulation that contained 35 weight percent sol, 15 weight percent zeolite and 50 weight percent clay. The catalyst had an alumina content of 27.8%, a rare earth content of 2.41%, a $Na_2O$ content of 0.57%, and an $SO_4$ content of 0.15%. The product had a nitrogen pore volume of 0.07 and a water pore volume of 0.18. It had an apparently bulk density of 0.94 g/cc. and a Davison Attrition Index of 1.

The activity of the resulting catalyst was compared to the activity of the same standard catalyst used in Example 1. The data is set out in Table 2.

Table II

| | Microactivity at 1070°F. | |
|---|---|---|
| WHSV | 2 | 16 |
| Catalyst of this Example | 88.8 | 64.5 |
| Standard Catalyst | 87.7 | 66.7 |

It should be noted that the apparent bulk density of this catalyst was very similar to the apparent bulk density of the catalyst of Example 1 and that the Davison Attrition Index was very low.

EXAMPLE 3

This example illustrates another preparation of the same type as discussed in Example 1.

A silica sol was prepared as in Example 1. A total of 175 pounds of this sol was mixed with 2.14 pounds of the same zeolite in Example 1 and 10 pounds of clay. The final formulation contained 25 weight percent silica sol, 15 weight percent faujasite and 60 weight percent clay. The catalyst after preparation contained 1.93 weight percent rare earth, 0.49 weight percent $Na_2O$, and 0.14 weight percent sulfate $SO_4$. It had a nitrogen pore volume of 0.12 and a water pore volume of 0.22. The product had an apparent bulk dnesity of 0.76 and a Davison Attrition Index of 12. The activity of the resulting catalyst was compared to the activity of the same standard catalyst as in Example 1. The data collected is set out in Table III.

Table III

| | Microactivity at 1070°F. | |
|---|---|---|
| WHSV | 2 | 16 |
| Catalyst of this Example | 88.5 | 66.7 |
| Standard Catalyst | 87.7 | 65.7 |

It is apparent from these data that this catalyst compared favorably in activity to the standard catalyst and had a satisfactory attrition index.

EXAMPLE 4

This example illustrates a preparation wherein the sol was artifically gelled by adding sufficient sodium silicate to raise the pH to 5.3. A total of 175 pounds of said sol was mixed with 2.2 pounds of zeolite and 4.5 pounds of clay silica, (15 weight percent zeolite and 25 weight percent clay). The catalyst, afer preparation, contained 32.35 weight percent alumina, 0.64 weight percent sodium, and 0.20 weight percent sulfate. It had a nitrogen pore volume of 0.27 and a water pore volume of 0.28. The product had an apparent bulk density of 0.52 and a Davison Attrition Index of 39, which compares favorably with products currently commercially available. The activity of the resulting catalyst was compared to the activity of the same standard catalyst as in Example 1. The data collected is set out in Table IV.

Table IV

| | Microactivity at 1070°F. | |
|---|---|---|
| WHSV | 2 | 16 |
| Catalyst of this Example | 87.7 | 69.3 |
| Standard Catalyst | 87.7 | 68.6 |

What is claimed is:
1. A process for preparing a cracking catalyst having high activity and high density which comprises:
    a. preparing a silica sol having a silica content of about 1 to 8 weight percent which is essentially free of sodium and passing said solution through an ion exchange resin bed,
    b. adding clay in an amount equal to 0–70 weight percent of the finished catalyst to said sol,
    c. preparing a water slurry of a faujasitic zeolitic aluminosilicate and adjusting the pH to about 3 to 6,
    d. mixing said slurry with the silica sol-clay slurry,
    e. spray drying and recovering the catalyst product.
2. The process according to claim 1 wherein the zeolite is a faujasite that has been pretreated to reduce the $Na_2O$ content to less than 3% and exchanged to a rare earth content of 0 to 24 percent by weight.
3. The process according to claim 1 wherein the clay is selected from the group consisting of kaolin, halloysite and montmorillonite.
4. The process according to claim 1 wherein the zeolite is present as about 3 to 60 weight percent of the final catalyst.
5. A process for preparing a cracking catalyst having a high density and high activity which comprises:
    a. preparing a silica sol which is essentially free of sodium by diluting a sodium silicate solution to a concentration of about 1 to 8 percent and passing said solution through an ion exchange resin bed,
    b. adding kaolin in an amount equal to 0 to 70 weight percent of the finished catalyst to said sol,
    c. preparing a water slurry of a faujasitic aluminosilicate having an $Na_2O$ content of less than 1 percent and a rare earth content of about 5 to 18 weight percent,
    d. mixing the aluminosilicate slurry in an amount equal to 3 to 60 weight percent of the final catalyst with the silica sol-clay slurry,
    e. spray drying and recovering the catalyst product.

* * * * *

UNITED STATES PATENT OFFICE
CERTIFICATE OF CORRECTION

Patent No. 3,972,835          Dated August 3, 1976

Inventor(s) Gordon H. Hoffman et al.

It is certified that error appears in the above-identified patent and that said Letters Patent are hereby corrected as shown below:

Column 6, claim 1 should be deleted and the following claim substituted therefor:

1. A process for preparing a cracking catalyst having a high density and high activity which comprises:

(a) preparing a silica sol which is essentially free of sodium by diluting a sodium silicate solution to a concentration of about 1 to 8 percent and passing said solution through an ion exchange resin bed, (b) adding kaolin in an amount equal to 10 to 65 weight percent of the finished catalyst to said sol, (c) preparing a water slurry of a faujasitic aluminosilicate having an $Na_2O$ content of less than 1 percent and a rare earth content of about 5 to 18 weight percent, (d) mixing the aluminosilicate slurry in an amount equal to 3 to 60 weight percent of the final catalyst with the silica sol-clay slurry, (e) spray drying and recovering the catalyst product.

Signed and Sealed this

Twenty-first Day of December 1976

[SEAL]

Attest:

RUTH C. MASON
*Attesting Officer*

C. MARSHALL DANN
*Commissioner of Patents and Trademarks*